United States Patent [19]

Harder, Jr.

[11] 4,120,533

[45] Oct. 17, 1978

[54] CANTILEVERED SUPPORTING SHELL FOR SEAT

[75] Inventor: Arthur J. Harder, Jr., Franklin Park, Ill.

[73] Assignee: Coach and Car Equipment Corporation, Elk Grove Village, Ill.

[21] Appl. No.: 801,842

[22] Filed: May 31, 1977

[51] Int. Cl.² .............................................. A47C 1/12
[52] U.S. Cl. ..................................... 297/451; 297/232
[58] Field of Search ............... 108/48; 248/188.1, 235, 248/345; 296/63, 64; 297/232, 450, 451, 445

[56] References Cited

U.S. PATENT DOCUMENTS

| | | | |
|---|---|---|---|
| 3,897,974 | 8/1975 | Barecki | 297/451 |
| 4,036,527 | 7/1977 | Faul | 297/232 X |

*Primary Examiner*—James C. Mitchell
*Attorney, Agent, or Firm*—Merriam, Marshall & Bicknell

[57] ABSTRACT

A seat in a mass transit vehicle, such as a bus or subway car, extends lengthwise from the vehicle wall toward the aisle. The seat is supported from below by a cantilevered supporting shell comprising a trough-shaped structural skin and a tubular frame without diagonal bracing. The trough-shaped skin has an open top and an open end at the vehicle wall.

21 Claims, 8 Drawing Figures

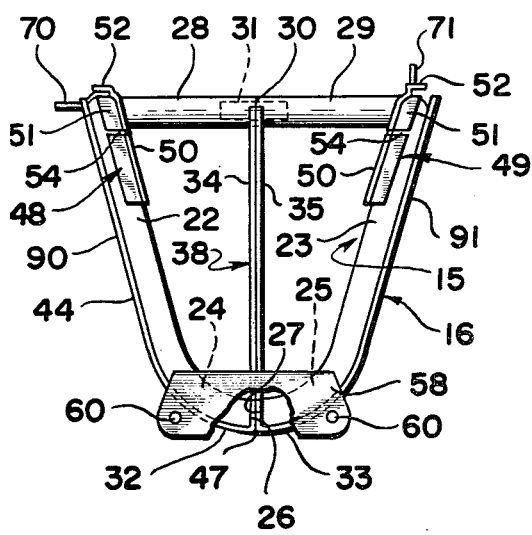
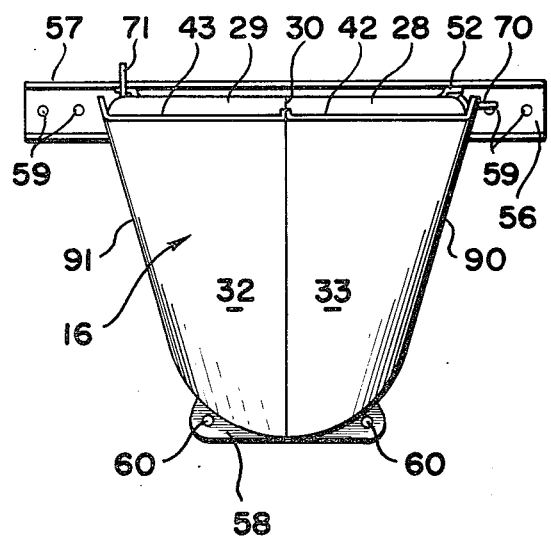
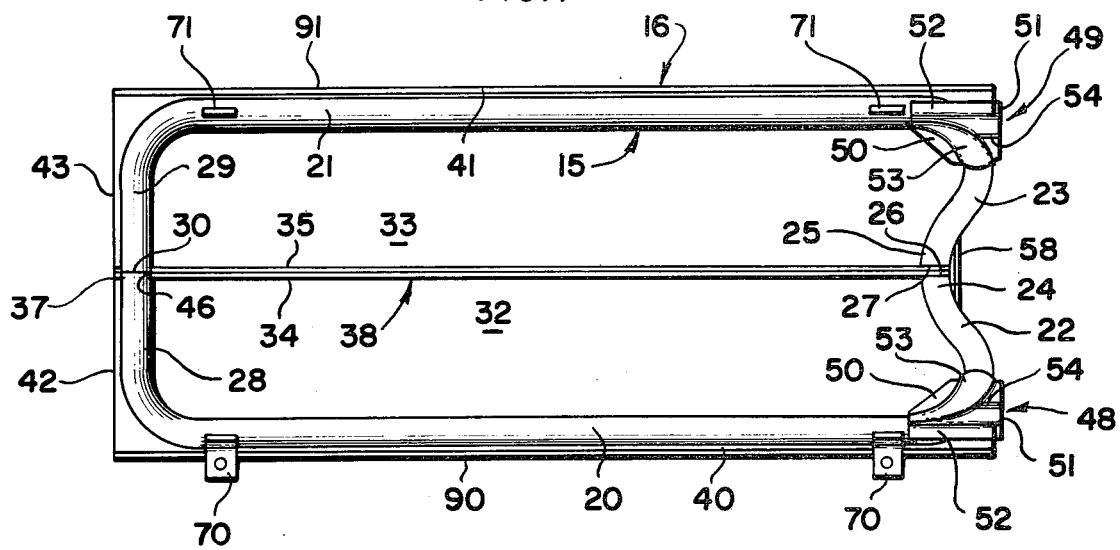
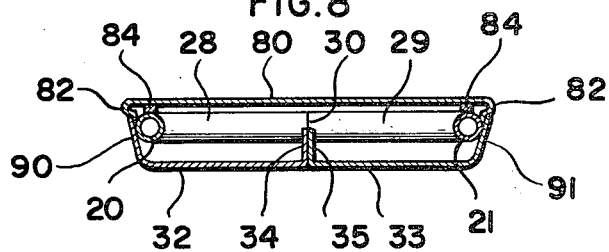

CANTILEVERED SUPPORTING SHELL FOR SEAT

BACKGROUND OF THE INVENTION

The present invention relates generally to seats for mass transit vehicles such as buses, subway cars, commuter trains and the like, and more particularly to seats of this type which are cnatilevered from a sidewall of the vehicle.

Transit vehicle seating is generally arranged with two seats in side-by-side relation located between a sidewall and a center aisle of the vehicle. For a number of reasons, it is desirable that the seats be cantilevered from the sidewall rather than being supported by legs or pedestals located beneath the seat and supported by the floor of the vehicle. For example, legs or pedestals interfere with cleaning of the floor of the vehicle, and they can impede movement of passengers along the aisle and into and out of the seats.

Conventional cantilevered seats for transit vehicles or the like are disclosed in Barecki U.S. Pat. Nos. 3,747,979 and 3,897,974. A conventional cantilevered seat, of the type disclosed in said Barecki patents, generally comprises a seat resting atop a cantilevered frame. The frame includes a pair of horizontally disposed frame members extending outwardly from the sidewall toward the center aisle of the vehicle, appropriate cross-frame members extending between the two horizontally extending members and a pair of brace members each extending from a lower portion of the vehicle sidewall upwardly and outwardly to an outer portion of a respective horizontally extending frame member. The brace members may be either diagonal or arcuate.

It is also conventional to hang a cover or housing on the cantilevered frame and to house within that cover accessories such as a blower motor and fan for air-conditioning or heating, a speaker for a public address system, a light for illuminating the vehicle floor, and electrical wiring used with such accessories. The cover performs no structural function but serves merely an aesthetic purpose to hide from view the wiring and accessories. The structural frame supports not only the seat but also the cover and accessories. Accordingly, the structural frame is relatively heavy and requires a number of components, all of which increase the cost and the complexity of manufacturing the cantilevered structure.

SUMMARY OF THE INVENTION

In accordance with the present invention, there is provided a cantilevered shell composed of a frame and a structural skin both of which cooperate to support a seat in cantilevered relation to the sidewall of the vehicle. This cantilevered shell eliminates a number of the drawbacks of the conventional cantilevered supporting structure described above. The frame comprises a pair of horizontally extending frame members joined at their outer ends by a cross piece and connected at their inner ends to the upper ends of a pair of vertically extending frame elements joined at their lower ends by a cross piece. This is the totality of the framework. No other cross pieces are required and no diagonal or arcuate braces are required.

To augment the supporting function of the framework described in the preceding paragraph, a rigid, trough-shaped structural skin is provided. This structural skin is integral with the frame and cooperates with the frame to provide the support for the seat. The structural skin also performs the covering and housing functions of the non-supporting cover utilized in the conventional cantilevered seats described above under the heading "BACKGROUND OF THE INVENTION.".

Because the structural skin performs a supporting function, there is a reduction in the weight support requirements of the frame members, in turn reducing the strength requirements for the frame members as well as the number of frame components. The frame is thus relatively simple in construction and relatively light in weight, and its components are few in number compared to the framework utilized in conventional prior art cantilevered seats. The trough-shaped rigid supporting skin is also relatively simple to construct, relatively lightweight, and is attractive to the eye.

Other features and advantages are inherent in the structure claimed and disclosed or will become apparent to those skilled in the art from the following detailed description in conjunction with the diagrammatic drawing.

BRIEF DESCRIPTION OF THE DRAWING

FIG. 4 is an exploded perspective view of the components of the supporting shell;

FIG. 5 is an enlarged wall-end view of the supporting shell, partially cut away;

FIG. 6 is an enlarged aisle-end view of the supporting shell;

FIG. 7 is a plan view of the supporting shell; and

FIG. 8 is a sectional view taken along line 8—8 in FIG. 3.

DETAILED DESCRIPTION

Figure 1:
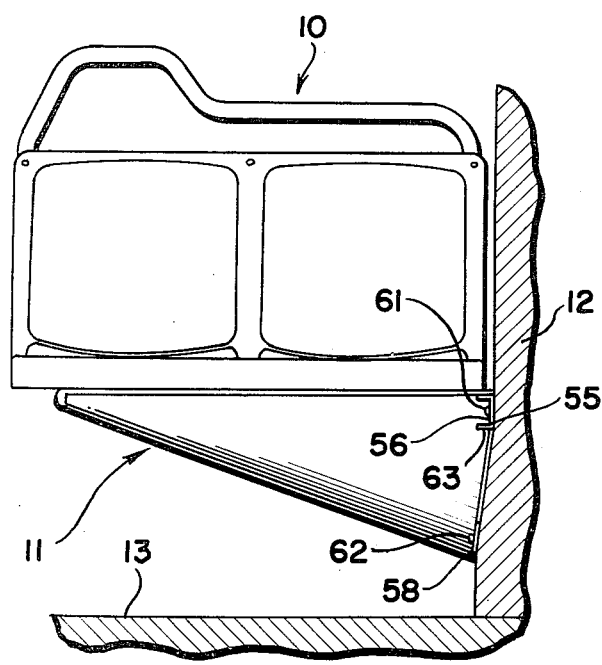
FIG. 1 is a front view of a seat resting atop a cantilevered supporting shell constructed in accordance with an embodiment of the present invention.
Figure 2:
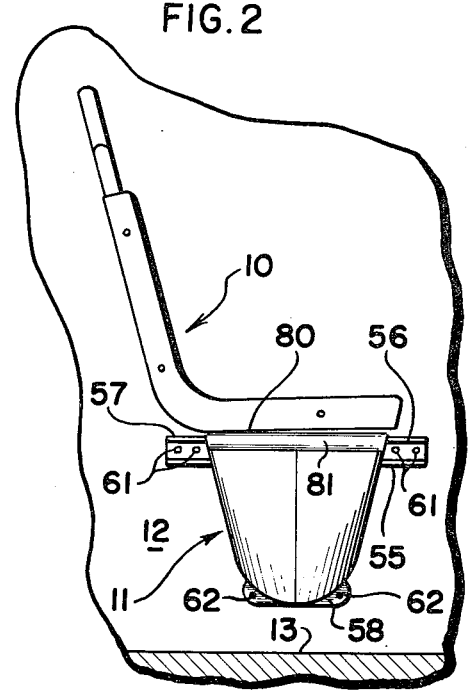
FIG. 2 is an aisle-end view of the seat and supporting shell of FIG. 1.

Referring initially to FIGS. 1 and 2, indicated generally at 10 is a two-passenger seat resting atop a supporting shell indicated generally at 11 and cantilevered from a sidewall 12 of a transit vehicle having a floor 13.

Referring to FIGS. 3–8, supporting shell 11 includes a tubular frame 15 and a rigid, trough-shaped, structural skin 16 integral with frame 15. Skin 16 is an integral part of the supporting structure, and the skin carries a substantial amount of the load from seat 10.

As shown in FIG. 4, tubular frame 15 is composed of two discrete parts 17, 18 each bent into the configuration shown in FIG. 4 and joined together with the other half to form frame 15. Each frame half 17, 18 comprises a respective horizontally extending frame part 20, 21 each having an inner end portion integral with the upper end portion of a vertically extending frame part 22, 23 respectively. Each vertical frame part 22, 23 has a lower end portion integral with a respective lower connecting part 24, 25 each having a respective terminal end 26, 27 (FIG. 5). Each horizontally extending frame part 20, 21 also comprises an outer end portion integral with a respective outer connecting part 28, 29 connected together at 30, by welding, and reinforced by a plug 31 located within connecting parts 28, 29 at their connection 30.

Each of the horizontally extending frame parts or members 20, 21 are elongated, spaced apart and lie in substantially the same horizontal plane. Each of the vertically extending frame parts or elements 22, 23 are spaced apart and lie in substantially the same vertical plane. The outer connecting parts 28, 29 connect together the elongated horizontally extending frame member 20, 21 at their outer ends and the lower connecting parts 24, 25 together with other structure to be subsequently described, connect together the vertically extending frame parts 22, 23 at their lower ends.

Trough-shaped skin 16 is composed of two separate halves joined together. Each half comprises a respective side portion 90, 91 integral with a respective bottom portion 32, 33 integral with a respective upstanding lip portion 34, 35. Lip portions 34, 35 are joined together along their length, as by welding, to form a central reinforcing flange 38 extending from a first or inner end 36 of the bottom portion of skin 16 to a second or outer end 37 of the bottom portion of skin 16.

Trough-shaped skin 16 has an open upper end defined by an upper peripheral edge comprising side edge portions 40, 41 and outer edge portions 42, 43. Skin 16 also has an open inner end defined by an inner peripheral edge comprising edge portions 44, 45.

As shown in the figures, the inner open end of the trough-shaped skin is vertically disposed and has a top and bottom. The open upper end of the trough-shaped skin is horizontally disposed and has an inside and an outside. The closed bottom portion (32, 33) of the trough-shaped skin is inclined upwardly from the bottom of the skin's open inner end to the outside of the skin's open upper end.

As shown in FIGS. 4 and 5, trough-shaped skin 16 has a first cross-section, adjacent its open inner end in the form of a modified V comprising a pair of downwardly converging side portions (shown at 44, 45 in FIG. 4) each integral with a concavely curved bottom portion shown at 36 in FIG. 4. Further, as shown in FIGS. 4, 6 and 8, the cross-section of trough-shaped skin 16 gradually changes, in a direction toward the outer end of the skin, from the modified V-shaped, first cross-section, described above, to a substantially U-shaped, second cross-section adjacent the outer end of the skin.

Trough-shaped skin 16 is assembled to frame 15 with the skin on the outside of and below the frame. The two are secured together by welding the peripheral edge portions at 40-45 of skin 16 to the tubular frame parts 20-25 and 28-29 of frame 15, around both the upper open end and the inner open end of skin 16. More specifically, those portions of skin 16 adjacent edges 40, 41 are welded to frame parts 20, 21; those portions of skin 16 adjacent edges 42, 43 are welded to frame parts 28, 29; and those portions of skin 16 adjacent edges 44, 45 are welded to frame parts 22, 24 and 23, 25 respectively. The outer end of flange 38 is notched at 46 (FIGS. 3-4) to receive the outer frame parts 28, 29 at their connection 30 (FIG. 7). Inner end 47 of flange 38 is secured between the terminal ends 26, 27 of frame parts 24, 25 (FIGS. 3, 5 and 7) and the notch 46 at the outer end of flange 38 is secured to frame parts 28, 29.

As previously noted, skin 16 is an integral part of the supporting structure. Load is carried on the entire cross-section of skin 16, with a concentration of the load at the reinforcing flange 38 on the bottom of the skin. It is important that skin 16 be welded to frame 15 at vertically disposed frame parts 22, 23 to prevent the skin from "oil canning" at its inner end when a load is applied to the supporting shell.

Aside from the outer connecting parts 28, 29 and the lower connecting parts 24, 25 on frame 15, there is no cross-member on the frame, per se, and none is needed. Skin 16 will accommodate the forces for which cross-members would be needed in the absence of a structural skin.

Skin 16 is preferably composed of steel sheet (e.g., 20 gauge steel for a shell supporting a two-passenger seat). Frame 15 is preferably composed of steel tubing (e.g., 18 gauge 1¼" steel tubing for a shell supporting a two-passenger seat).

Alternatives to sheet steel for skin 16 are molded fiberglass or an injection molded, structural plastic such as polycarbonate or a high density polyurethane structural foam. A further alternative for the structural skin would be a rotationally cast, foam filled plastic. The primary consideration is that the skin be sufficiently strong to perform a supporting function as well as a covering or enclosing function for the cantilevered shell.

Skin 16 may be provided with such openings (not shown) as are necessary to accommodate blower fans, lights, speakers or other accessories housed within the skin.

Structure for mounting the cantilevered supporting shell on the sidewall of the vehicle will now be described. Welded to tubular frame 15, at the corners where horizontal frame members 20, 21 join vertical frame elements 22, 23, are a pair of gusset elements 48, 49 each the mirror image of the other. Gusset element 48 will be described in detail, with reference to FIGS. 3-5 and 7, and the description of gusset element 48 is equally applicable to gusset element 49.

Gusset element 48 comprises a vertically disposed side portion 50 located on the inside of frame half 17 at the junction of frame parts 20, 22. Integral with side portion 50 is a vertically disposed end portion 51 located at the inner end of frame part 22. Also integral with vertically disposed side portion 50 is a horizontally disposed top portion 52 overlying frame parts 20, 22. Vertically disposed gusset side portion 50 may have an indentation at 53 to accommodate the tubular frame parts 20, 22.

Figure 3:
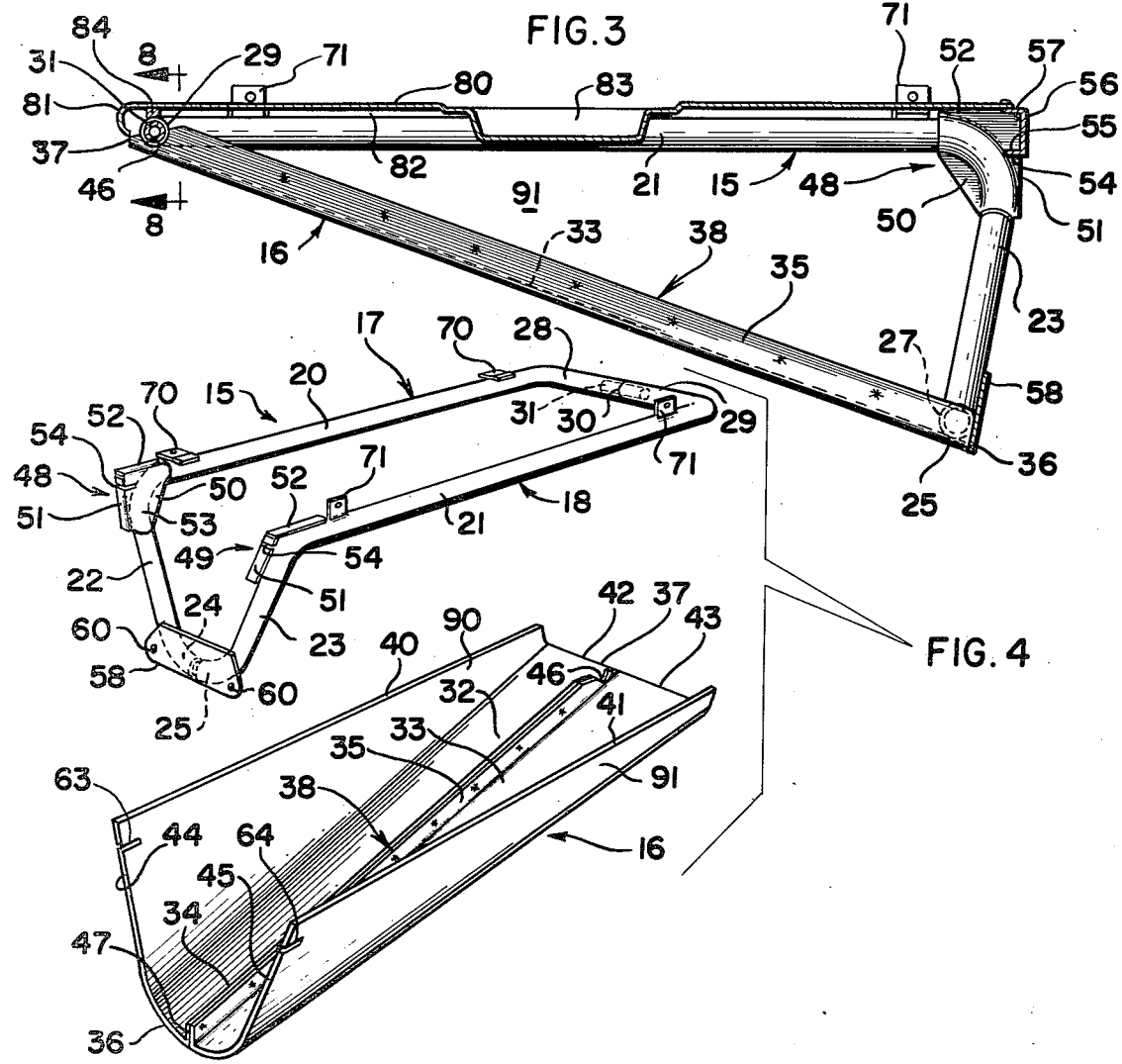
FIG. 3 is an enlarged vertical sectional view of an embodiment of the supporting shell.

Each gusset element also includes a notch 54 for receiving the lower flange 55 of a channel-shaped upper mounting bracket 56 having an upper flange 57 overlying the top portion 52 of the gusset element (FIG. 3). Referring to FIG. 4, in the side portions 90, 91 of skin 16 at their inner edges 44, 45 are notches 63, 64 respectively for receiving the lower flange 55 of channel-shaped mounting bracket 56 when the latter is assembled to the cantilevered supporting shell (FIG. 1).

Attached to lower frame parts 24, 25 is a plate-shaped lower mounting bracket 58.

Channel-shaped upper mounting bracket 56 has a plurality of openings 59 (FIG. 6) for receiving fasteners to secure mounting bracket 56 to the wall of a vehicle, and lower mounting bracket 58 has a plurality of openings 60 (FIG. 5-6) for receiving fasteners to secure the lower mounting bracket to the sidewall of the vehicle. Channel-shaped upper bracket 56 is secured to the wall of the vehicle with fasteners 61, and plate-shaped lower bracket 58 is secured to the wall of the vehicle with fasteners 62 (FIG. 1 and 2).

The locations at which the supporting shell is attached to the vehicle wall are entirely on the outside of the supporting shell (note fasteners 61 and 62 in FIG. 2). This gives greater accessiblity to the attachments and greater structural integrity or stability because the attachments are spaced further apart than if they were located on the inside of the supporting shell.

After supporting shell 11 is attached to the sidewall of the vehicle, the open upper end of the supporting shell is closed with a cover 80 (FIGS. 2, 3 and 8). Thereafter, seat 10 is mounted atop the supporting shell using brackets 70, 71 respectively located atop horizontally extending frame parts 20, 21. Cover 80 has cut-outs to accommodate brackets 70, 71 on frame parts 20, 21.

Cover 80 prevents dirt, trash and the like from entering the interior of the seat-supporting shell. Cover 80 includes a depending outer end 81 and depending sides 82, 82 to assure the complete closure of the open upper end of the supporting shell. Cover 80 may include a recess 83 (FIG. 3) for accommodating accessory equipment. Located between cover 80 and the horizontally disposed frame parts of frame 15, at the outer ends thereof, are spacers 84.

Cover 80 may be composed of a light metal (e.g., aluminum), fiberglass or plastic. Cover 80 does not serve any significant structural function, but merely keeps extraneous material from entering the interior of the supporting shell.

The foregoing detailed description has been given for clearness of understanding only, and no unnecessary limitations should be understood therefrom, as modifications will be obvious to those skilled in the art.

What is claimed is:

1. Structure for supporting a seat in cantilevered relation to a wall, said structure comprising:
   a rigid, trough-shaped, structural, exterior skin;
   said trough-shaped skin having an outer end and an open inner end;
   means for mounting said inner end of said trough-shaped skin on said wall;
   and means for mounting a seat atop said trough-shaped skin;
   said rigid, structural, exterior skin comprising means for providing cantilevered support to said seat.

2. A cantilevered supporting shell for a seat, said shell comprising:
   horizontally extending frame means having inner and outer ends;
   means at said inner end of the horizontally extending frame means for mounting said frame means on a wall;
   and trough-shaped, structural, exterior skin means integral with said frame means and located therebelow;
   said trough-shaped, structural, exterior skin means having an outer end and an open inner end;
   said structural, exterior skin means comprising means cooperating with said frame means to provide the support for said seat.

3. A cantilevered supporting shell as recited in claim 2 and comprising:
   an open upper end on said trough-shaped skin, adjacent said horizontally extending frame means, defined by an upper peripheral edge portion on the skin;
   and means fixing said upper peripheral edge portion of the skin to said horizontally extending frame means.

4. A cantilevered supporting shell as recited in claim 2 and comprising:
   vertically extending frame means at said inner end of said horizontally extending frame means and attached thereto;
   said open inner end on the trough-shaped skin being located adjacent said vertically extending frame means and being defined by an inner peripheral edge portion on the skin;
   and means fixing said inner peripheral edge portion of the skin to said vertically extending frame means.

5. A cantilevered supporting shell as recited in claim 4 and comprising:
   an open upper end on said trough-shaped skin, adjacent said horizontally extending frame means, defined by an upper peripheral edge portion on the skin;
   and means fixing said upper peripheral edge portion of the skin to said horizontally extending frame means.

6. A cantilevered supporting shell as recited in claim 5 wherein:
   said horizontally extending frame means comprises a pair of elongated frame members, spaced apart and lying in substantially the same horizontal plane, each of said elongated frame members having inner and outer end portions;
   and said vertically extending frame means comprises a pair of vertically extending frame elements spaced apart and lying in substantially the same vertical plane, each of said frame elements having upper and lower end portions, each of said upper end portions being connected to the inner end portions of a respective elongated frame member.

7. A cantilevered supporting shell as recited in claim 6 wherein:
   said structural skin comprises a closed bottom portion having first and second ends, said first end being located adjacent the lower end portions of said vertically disposed frame elements and said second end being located adjacent the outer end portions of said elongated frame members;
   said bottom portion of the structural skin including central reinforcing flange means projecting upwardly from said bottom portion and located between said first end and said second end thereof.

8. A cantilevered supporting shell as recited in claim 6 wherein:
   said horizontally extending frame means comprises first connecting frame means extending between said outer end portions of said elongated frame members for connecting them together;
   and said vertically extending frame means comprises second connecting frame means extending between said lower end portions of said vertically extending frame elements for connecting them together.

9. A cantilevered supporting shell as recited in claim 8 wherein:
   each upper end portion of a vertically extending frame element is integral with a respective inner end portion of an elongated frame member;
   said first connecting frame means is composed of two separate, discrete parts each integral with a respective outer end portion of an elongated frame member and having a terminal end facing the terminal end on the other part of the first connecting frame means;
   said second connecting frame means is composed of two separate, discrete parts each integral with a respective lower end portion of a vertically extending frame element and having a terminal end facing the terminal end on the other part of the second connecting frame means;

said structural skin comprises a closed bottom portion having inner and outer ends;

said bottom portion including central reinforcing flange means projecting upwardly from said bottom portion and located between said inner end and said outer end thereof;

said flange means comprising an inner end part at said inner end of the bottom portion and an outer end part at said outer end of the bottom portion;

said inner end part of the flange means being secured to the second connecting frame means adjacent the facing terminal ends on the two parts thereof;

said outer end part of the flange means being secured to the first connecting frame means adjacent the facing terminal ends on the two parts thereof.

10. A cantilevered supporting shell as recited in claim 5 wherein:

said structural skin comprises a closed bottom portion;

said inner open end of the trough-shaped skin is vertically disposed and has a top and bottom;

said open upper end of the trough-shaped skin is horizontally disposed and has an inside terminus and an outside terminus;

and said closed bottom portion is inclined upwardly from (1) the bottom of said open inner end to (2) the outside terminus of said open upper end.

11. A cantilevered supporting shell as recited in claim 10 wherein:

said structural skin comprises a pair of side portions each integral with said bottom portion.

12. A cantilevered supporting shell as recited in claim 11 wherein:

said structural skin comprises two parts each including one of said side portions and one half of said bottom portion;

each half of said bottom portion comprising a part thereof terminating at an upstanding lip fixed to the other of said upstanding lips to provide central reinforcing flange means for said trough-shaped structural skin and to connect together said two parts of the structural skin.

13. A cantilevered supporting shell as recited in claim 2 wherein said horizontally extending frame means is devoid of any cross member at a location between said inner and outer ends of the frame means.

14. A cantilevered supporting shell as recited in claim 2 and comprising:

vertically extending frame means at said inner end of said horizontally extending frame means and attached thereto;

said shell being devoid of any brace having both vertical and horizontal components and extending between said vertically extending frame means and said horizontally extending frame means.

15. A cantilevered supporting shell as recited in claim 14 wherein said horizontally extending frame means is devoid of any cross member at a location between said inner and outer ends of the frame means.

16. A cantilevered supporting shell as recited in claim 2 wherein said means for mounting said horizontally extending frame means on a wall comprises:

a horizontally disposed mounting bracket extending transversely to said horizontally extending frame means at the latter's inner end;

means securing said bracket to said horizontally extending frame means at the latter's inner end;

and means on said bracket, located outwardly of said shell on each side thereof, for securing said bracket to a wall.

17. Structure for supporting a seat, as recited in claim 1, and comprising:

flange means integral with said skin for reinforcing said skin.

18. Seat-supporting structure as recited in claim 1 wherein:

said trough-shaped skin has a first cross-section, adjacent its open inner end, in the shape of a modified V comprising a pair of downwardly converging side portions each integral with a concavely curved bottom portion;

the cross-section of said skin gradually changing, in a direction toward said outer end of the skin, from said first cross-section to a substantially U-shaped, second cross-section, adjacent said outer end of the skin.

19. Seat supporting structure as recited in claim 18 wherein:

said seat-supporting structure is devoid of any cross-member at a location between said inner and outer ends of said trough-shaped skin.

20. A cantilevered supporting shell as recited in claim 2 wherein:

said trough-shaped skin has a first cross-section, adjacent its open inner end, in the shape of a modified V comprising a pair of downwardly converging side portions each integral with a concavely curved bottom portion;

the cross-section of said skin gradually changing, in a direction toward said outer end of the skin, from said first cross-section to a substantially U-shaped, second cross-section, adjacent said outer end of the skin.

21. A cantilevered supporting shell as recited in claim 20 wherein:

said seat-supporting structure is devoid of any cross-member at a location between said inner and outer ends of said trough-shaped skin.

* * * * *